Jan. 22, 1963   P. L. PAULL   3,074,783
PRODUCTION OF SULFUR-FREE HYDROGEN AND CARBON DIOXIDE
Filed June 19, 1959
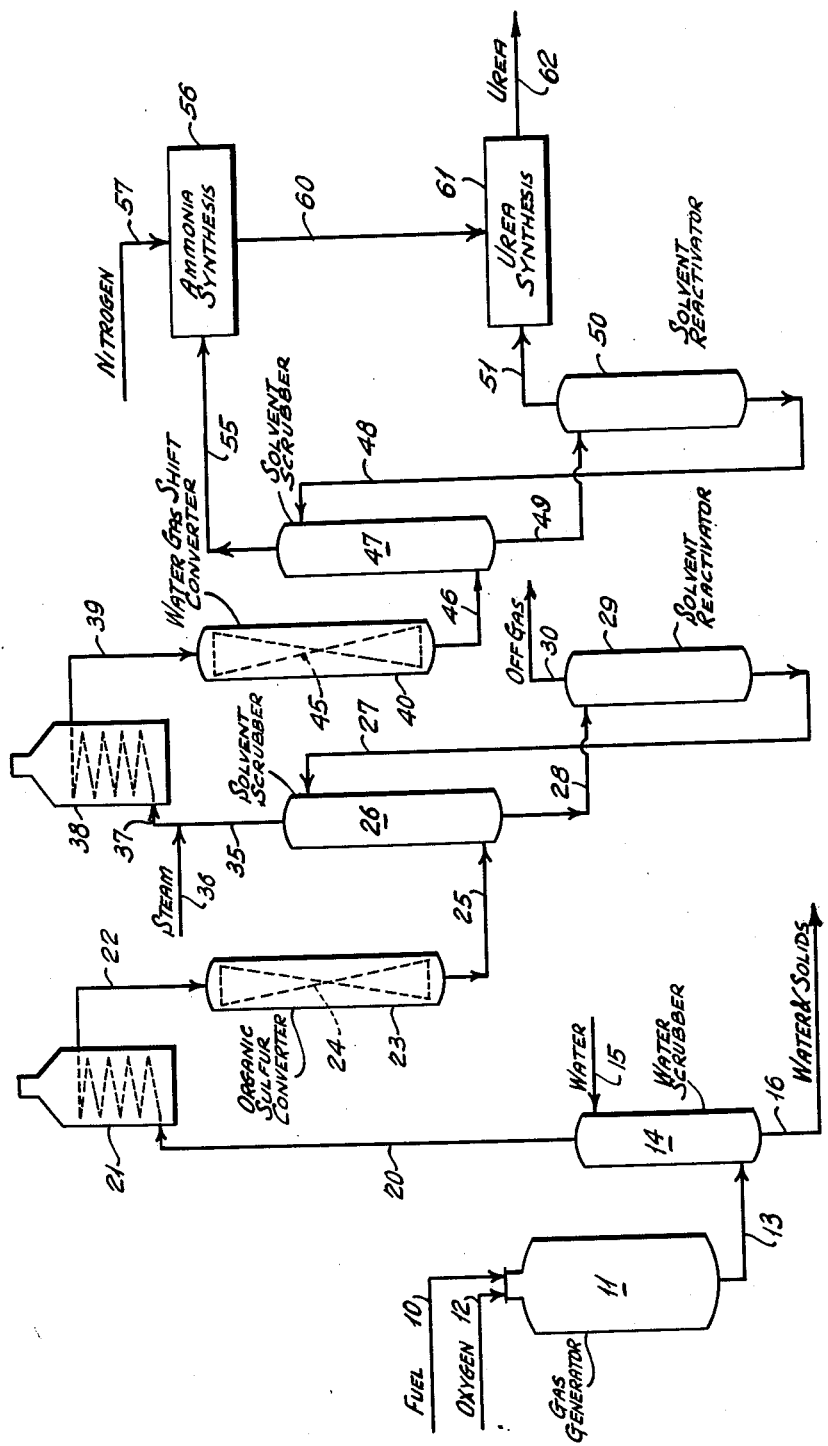

United States Patent Office 3,074,783
Patented Jan. 22, 1963

3,074,783
PRODUCTION OF SULFUR-FREE HYDROGEN AND CARBON DIOXIDE
Peter L. Paull, Weston, Conn., assignor to Texaco Development Corporation, New York, N.Y., a corporation of Delaware
Filed June 19, 1959, Ser. No. 821,536
1 Claim. (Cl. 23—212)

This invention relates to a method for the production of hydrogen and carbon dioxide. More particularly, it is directed to a method of treating a gas comprising carbon monoxide and carbonyl sulfide to produce hydrogen and carbon dioxide by the water gas shift reaction.

In accordance with the process of this invention gases containing carbon monoxide and carbonyl sulfide are contacted with a catalyst comprising molybdenum sulfide at temperatures effective to convert carbonyl sulfide to hydrogen sulfide. After separation of hydrogen sulfide, the treated gases are contacted with a water gas shift catalyst under water gas shift conditions forming a product gas stream comprising hydrogen.

Hydrogen is advantageously produced by the partial oxidation of carbonaceous fuels forming carbon monoxide and hydrogen followed by water gas shift of the carbon monoxide to produce additional quantities of hydrogen. Hydrogen sulfide and organic sulfur appear in the partial oxidation products when low priced fuels containing sulfur, for example, residual fuel oils and coal, are used. The organic sulfur in the partial oxidation products consists essentially of carbonyl sulfide. The presence of carbonyl sulfide in the partial oxidation products is undesirable since it adversely affects the activity of conventional water gas shift catalyst, for example, iron oxide catalysts, and appears in the water gas shift conversion products when conventional catalysts are employed. After shifting, the gases are contacted with a selective solvent for the removal of carbon dioxide and hydrogen sulfide to produce commercially pure hydrogen. Carbonyl sulfide reacts with monoethanolamine resulting in high solvent losses so that when carbonyl sulfide is present in the shifted gas, other solvents which are more expensive to use, for example diethanolamine, must be employed. The sulfur in the form of hydrogen sulfide which appears in the carbon dioxide separated from the water gas shift conversion products renders this carbon dioxide stream unsuitable for use in the manufacture of other products, for example, urea without expensive further processing.

In accordance with the process of this invention the partial oxidation products containing carbonyl sulfide are contacted with a catalyst comprising molybdenum sulfide under conditions effective to convert carbonyl sulfide to hydrogen sulfide. The hydrogen sulfide is less objectionable in that it is less harmful to shift conversion catalysts and may be removed by absorption in monoethanolamine without excessive solvent losses. The molybdenum sulfide exhibits activity in catalyzing the water gas shift reaction so that a portion of the carbon monoxide is reacted with water vapor forming some carbon dioxide and hydrogen. After removal of carbon dioxide and hydrogen sulfide, the treated gas is subjected to contact with a shift conversion catalyst to effect conversion of substantially all of the carbon monoxide to carbon dioxide with formation of additional hydrogen. The carbon dioxide is separated from the products of this water gas shift conversion step to produce a carbon dioxide stream of low sulfur content which may be utilized with little additional treatment in the manufacture of urea.

In the partial oxidation of sulfur containing carbonaceous fuels, for example, coal, petroleum oils or sour natural gas, the fuel is reacted with an oxygen containing gas in a closed compact reaction zone at an autogenous temperature within the range of about 1800 to 3500° F. Reaction temperatures are preferably maintained within the range of about 2200 to 2800° F. The reaction zone is maintained at a pressure above about 100 pounds per square inch gauge and may be as high as about 600 pounds per square inch gauge. Steam may be introduced into the reaction zone to assist in the dispersion of the fuel into the reactor, to assist to control of the reaction temperature, and as a reactant effective to increase the relative amount of hydrogen produced. Preheating the reactants is generally desirable. The reaction zone is free from packing and catalyst and has nearly minimum internal surface. The product consists essentially of carbon monoxide and hydrogen and contains relatively small amounts of water vapor, carbon dioxide, entrained carbonaceous solid, and sulfur in the form of hydrogen sulfide and carbonyl sulfide. Depending upon the character of the sulfur containing carbonaceous fuel employed, the relative amount of steam employed, the ratio of oxygen to fuel, and other operating conditions, the composition of the product gas may fall within the following ranges on a dry, mol percent basis:

Hydrogen _____ 25 to 62
Carbon monoxide _____ 35 to 53
Carbon dioxide _____ 3 to 20
Hydrogen sulfide _____ 0.5 to 2.0
Carbonyl sulfide _____ .025 to 0.3

Water vapor appears as a reaction product and as unconverted water when steam is introduced with the feed and may vary within the range of about 4 to 20 mol percent. When the product gas is scrubbed with water, it becomes saturated at the scrubbing temperature.

The amount of uncombined oxygen supplied to the reaction zone is limited so that near maximum yields of carbon monoxide and hydrogen are obtained. Air, oxygen enriched air or substantially pure oxygen may be employed in the partial oxidation process. Oxygen of high purity is readily obtained by the rectification of air. Commercial oxygen plants, capable of delivering large amounts of high purity oxygen, typically produce oxygen streams containing in excess of 95 mol percent of oxygen, and oxygen of this purity is generally preferred.

Product gases issuing from the gas generation step contain a large amount of sensible heat. This heat may be employed to convert water to steam. Steam may be generated in admixture with the product gases by introducing water directly into the effluent gases from the generator. Where steam admixed with the synthesis gas stream is not desired, heat may be recovered from the gas generator effluent by passing the gases through heat exchangers or waste heat boilers. Steam, for process or power use is advantageously produced in such waste heat boilers. Process streams, for example, fuel to the gas generation step, may be heated by indirect heat exchange with the partial oxidation products. The entrained carbonaceous solid is effectively removed from the product gases by contacting the gases with water in gas-liquid contact apparatus, for example, spray towers, bubble towers, baffle towers or packed towers.

The partial oxidation products, freed of carbonaceous solids, are contacted with a catalyst comprising molybdenum sulfide at a temperature within the range of about 400 to 850° F. preferably within the range of about 700 to 800° F. It is generally desirable to effect this treating step at substantially the pressure of the gas generation and scrubbing steps. In the molybdenum sulfide treating step, about 70 to 92 percent of the carbonyl sulfide is hydrogenated to form hydrogen sulfide. Additionally the molybdenum sulfide, acting as a water gas shift conversion catalyst, effects conversion of about 30 to 70 percent of the carbon monoxide to carbon dioxide with the formation of hydrogen. Effluent from the molybdenum sulfide treating step is contacted with a selective solvent, for example monoethanolamine, effecting removal of substantially all of the carbon dioxide and hydrogen sulfide and the remaining carbonyl sulfide producing a desulfurized gas comprising predominantly hydrogen with about 10 to 35 percent carbon monoxide. Although the remaining small amount of carbonyl sulfide may react with the monoethanolamine, the solvent loss is negligible and is commercially acceptable.

The desulfurized gas is admixed with steam at a rate of about three to six mols of steam per mol of carbon monoxide. The combined stream is contacted with a shift conversion catalyst, preferably an iron oxide catalyst, at a temperature within the range of 600 to 1000° F. effecting conversion of 90 to 99 percent of the carbon monoxide to carbon dioxide with the production of hydrogen. The water gas shift effluent is cooled and scrubbed with a selective solvent to produce a hydrogen stream comprising about 96 percent hydrogen and a carbon dioxide stream comprising 99 percent carbon dioxide. The hydrogen stream is useful in the synthesis of ammonia and the carbon dioxide stream may be reacted with ammonia for the production of urea. For ammonia synthesis feed, the hydrogen may be contacted with liquid nitrogen to reduce the impurities to a few parts per million and additional nitrogen added to adjust the ratio of hydrogen to nitrogen to three to one.

An advantage of the process of this invention is that sulfur containing fuels are employed in the manufacture of hydrogen by partial oxidation and water gas shift conversion without the appearance of sulfur compounds in the product hydrogen, and additionally, a carbon dioxide stream is produced which is substantially free of sulfur compounds.

Another advantage of the process of this invention is that gaseous mixtures of hydrogen and carbon monoxide which contain carbonyl sulfide may be treated for conversion of the carbonyl sulfide to hydrogen sulfide and a portion of the carbon monoxide is concomitantly reacted by the water gas shift conversion reaction.

The accompanying drawing diagrammatically illustrates one form of the process of this invention. Although the drawing illustrates one arrangement of apparatus in which the process of this invention may be practiced, it is not intended to limit the invention to the particular apparatus or materials described.

A sulfur containing carbonaceous fuel dispersed in steam in line 1 is introduced into gas generator 11. Oxygen in line 12 is introduced into gas generator 11 with the fuel and steam and reacts therewith to produce gaseous products comprising hydrogen, carbon monoxide, carbonyl sulfide and hydrogen sulfide. The gaseous products are discharged through line 13 to water scrubber 14. In water scrubber 14, the gaseous products are contacted in countercurrent flow with water effecting cooling of the hot gaseous products, separation of entrained carbonaceous solids and saturation of the gases with water vapor. Water is introduced into the water scrubber through line 15 and water and separated solids are discharged through line 16 for disposal.

Gases saturated with water are discharged from scrubber 14 through line 20 and passed to heating coil 21. In heating coil 21, the gases are preheated to a temperature of about 650° F. The preheated gases are discharged through line 22 to organic sulfur converter 23. Organic sulfur converter 23 is a reactor filled with a fixed bed of molybdenum sulfide catalyst 24. In organic sulfur converter 23, substantially all of the carbonyl sulfide is converted to hydrogen sulfide. Gases from converter 23 are discharged through line 25 to solvent scrubber 26. Solvent scrubber 26 comprises a conventional gas-liquid scrubbing tower. Monoethanolamine solvent is introduced through line 27 and passes downward through scrubber 26 effecting absorption of hydrogen sulfide, carbon dioxide and any remaining unconverted carbonyl sulfide. Rich solvent containing absorbed gases is withdrawn from tower 26 through line 28 and discharged to solvent reactivator 29. Absorbed gases are stripped from the monoethanolamine in reactivator 29 and are discharged through gas line 30. Reactivated monoethanolamine is withdrawn from the bottom of reactivator 29 through line 27.

Scrubbed gas substantially free of sulfur compounds and comprising predominantly hydrogen and carbon monoxide is discharged from scrubber 26 through line 35. Steam in line 36 is admixed with the gas in line 35 to provide a mol ratio of about 3 to 6 mols of steam per mol of carbon monoxide and the mixture is passed through line 37 to heater 38. The steam-gas mixture is heated in preheater 38 to a temperature of about 600° F. and discharged through line 39 to water gas shift converter 40. Water gas shift converter 40 comprises a reactor containing a fixed bed of iron oxide water gas shift conversion catalyst 45. In water gas shift converter 40, substantially all of the carbon monoxide is converted to carbon dioxide with the formation of hydrogen by the water gas shift conversion reaction. Gases comprising carbon dioxide and hydrogen are discharged through line 46 to solvent scrubber 47 wherein they are contacted in countercurrent flow with monoethanolamine solvent introduced through line 48. Monoethanolamine solvent and absorbed carbon dioxide are withdrawn through line 49 and discharged to solvent reactivator 50. In solvent reactivator 50, the monoethanolamine is stripped to separate a carbon dioxide stream comprising 99 percent carbon dioxide which is discharged through line 51 and reactivated monoethanolamine solvent which is withdrawn through line 48.

Hydrogen of 95 percent or higher purity is discharged from solvent scrubber 47 through line 55 to ammonia synthesis facility 56. Nitrogen in line 57 is passed to ammonia synthesis facility 56 where it is reacted with the hydrogen to produce ammonia which is discharged through line 60. Carbon dioxide in line 51 and ammonia in line 60 are passed to urea synthesis facility 61 where they are reacted to produce urea. Product area is discharged through line 62.

*Example*

Bituminous coal is reacted with oxygen for the production of carbon monoxide and hydrogen. The bituminous coal has the following composition in weight percent (dry basis):

| | |
|---|---|
| Sulfur | 2.59 |
| Nitrogen | 1.50 |
| Carbon | 77.29 |
| Hydrogen | 4.93 |
| Oxygen | 5.38 |
| Ash | 8.31 |

The above bituminous coal at a rate of 8,111 pounds per hour is suspended in 7,812 pounds per hour of steam and reacted with 89,617 standard cubic feet per hour of oxygen of 95 mol percent purity. Product gas, at a rate of 304,750 standard cubic feet per hour (dry basis), has the following mol percent analysis:

| | |
|---|---|
| Carbon monoxide | 45.3 |
| Hydrogen | 36.7 |
| Carbon dioxide | 14.7 |
| Methane | 0.4 |
| Nitrogen | 0.9 |
| Monatomic gases (mainly argon) | 1.2 |
| Hydrogen sulfide | 0.7 |
| Carbonyl sulfide | 0.1 |

The foregoing gas is scrubbed with water, is heated to a temperature of 600° F. and contacted with a molybdenum sulfide catalyst at a pressure of 400 pounds per square inch gauge and at a volumetric hourly space velocity of 1200. Effluent gas from the molybdenum sulfide reaction zone has the following composition (mol percent, dry basis):

| | |
|---|---|
| Carbon monoxide | 23.0 |
| Hydrogen | 46.4 |
| Carbon dioxide | 27.8 |
| Methane | 0.3 |
| Nitrogen | 0.8 |
| Monatomic gases (mainly argon) | 1.0 |
| Hydrogen sulfide | 0.7 |
| Carbonyl sulfide | 0.0 |

The foregoing gas is scrubbed with monoethanolamine effecting separation of the carbon dioxide, hydrogen sulfide and carbonyl sulfide producing a gas comprising 259,556 standard cubic feet per hour having the following composition (mol percent, dry basis):

| | |
|---|---|
| Carbon monoxide | 31.9 |
| Hydrogen | 64.4 |
| Carbon dioxide | 0.8 |
| Methane | 0.5 |
| Nitrogen | 1.0 |
| Monatomic gases (mainly argon) | 1.4 |
| Hydrogen sulfide | 0.0 |
| Carbonyl sulfide | 0.0 |

Steam at a rate of 15,700 pounds per hour is admixed with the scrubbed gas, heated to a temperature of 725° F. and contacted with an iron oxide water gas shift conversion catalyst at a space velocity of 1,000. The shift gas is scrubbed with monoethanolamine solvent producing 258,367 standard cubic feet per hour of 96.4 percent hydrogen and 83,013 standard cubic feet per hour of 99 percent carbon dioxide.

The hydrogen produced is further purified by scrubbing with liquid nitrogen to remove substantially all of the remaining impurities. This purified hydrogen may then be reacted with 83,021 standard cubic feet per hour of nitrogen to produce 7,452 pounds per hour of ammonia. The 83,013 standard cubic feet per hour of carbon dioxide may be reacted with the 7,452 pounds per hour of ammonia to produce 13,137 pounds per hour of urea.

Obviously many modifications and variations of the invention as hereinbefore set forth may be made without departing from the spirit and scope thereof and only such limitations should be imposed as are indicated in the appended claim.

I claim:

A process for the production of hydrogen substantially free from carbon oxides and sulfur compounds and for the simultaneous production of carbon dioxide substantially free from sulfur compounds from a sulfur-containing carbonaceous fuel wherein said carbonaceous fuel is reacted with oxygen effecting partial oxidation to gaseous products comprising carbon monoxide, hydrogen and carbonyl sulfide which comprises contacting said gaseous products of partial oxidation and steam with a molybdenum sulfide catalyst at a temperature within the range of about 400 to 850° F. effecting conversion of carbonyl sulfide to hydrogen sulfide and effecting conversion of a portion of said carbon monoxide to carbon dioxide with the formation of hydrogen, separating hydrogen sulfide, unconverted carbonyl sulfide and carbon dioxide from the molybdenum sulfide catalyst treated gases forming a low sulfur gas comprising hydrogen and carbon monoxide, contacting said low sulfur gas and steam with a water gas shift conversion catalyst at a temperature within the range of about 600 to 1000° F., and separating carbon dioxide from the water gas shift conversion products thereby producing a product gas stream comprising hydrogen and a separate product gas stream comprising carbon dioxide substantially free from sulfur compounds.

References Cited in the file of this patent

UNITED STATES PATENTS

| 2,465,235 | Kubicek | Mar. 22, 1944 |
| 2,892,685 | Paull | June 30, 1959 |

FOREIGN PATENTS

| 340,016 | Great Britain | Dec. 16, 1930 |

UNITED STATES PATENT OFFICE
CERTIFICATE OF CORRECTION

Patent No. 3,074,783 January 22, 1963

Peter L. Paull

It is hereby certified that error appears in the above numbered patent requiring correction and that the said Letters Patent should read as corrected below.

Column 3, line 51, for "1" read -- 10 --; column 4, line 43, for "area" read -- urea --.

Signed and sealed this 6th day of August 1963.

(SEAL)
Attest:

ERNEST W. SWIDER
Attesting Officer

DAVID L. LADD
Commissioner of Patents